United States Patent [19]

Mitchell

[11] 4,282,094

[45] Aug. 4, 1981

[54] FILTERING APPARATUS

[75] Inventor: Edson Mitchell, Northridge, Calif.

[73] Assignee: Charles F. Betz, Arcadia, Calif.

[21] Appl. No.: 109,981

[22] Filed: Jan. 7, 1980

[51] Int. Cl.³ .............................................. B01D 29/24
[52] U.S. Cl. .............................. 210/167; 210/DIG. 8; 210/172; 210/331; 210/416.1
[58] Field of Search ................... 210/167, 172, 416 R, 210/DIG. 8, 193, 331; 99/408

[56] References Cited

U.S. PATENT DOCUMENTS

| | | | |
|---|---|---|---|
| 2,902,161 | 9/1959 | Humbert, Jr. | 210/DIG. 8 |
| 3,147,220 | 9/1964 | Avery | 210/DIG. 8 |
| 3,187,898 | 6/1965 | Belter | 210/331 |
| 3,279,605 | 10/1966 | Shepherd | 210/DIG. 8 |
| 3,337,055 | 8/1967 | Strame et al. | 210/DIG. 8 |
| 3,630,361 | 12/1971 | Keaty | 210/DIG. 8 |
| 4,043,916 | 8/1977 | Wecher, Jr. | 210/167 |

*Primary Examiner*—Theodore A. Granger

*Attorney, Agent, or Firm*—Georges A. Maxwell

[57] ABSTRACT

An oil filtering and purifying apparatus comprising a closed pressure tank with fluid inlet and outlet openings and a plurality of vertically stacked filter units removably arranged within the tank; the filter units have central hubs with vertical flow passages; the flow passages of adjacent hubs communicate with each other and with the outlet opening; each unit includes a lower horizontal plate carried by its hub, a felting screen supported in spaced relationship above the plate and cooperating therewith to define a fluid conducting chamber below the screen and about the hub; and fluid ports in the hub communicating with the flow passage therein and with the chamber related thereto; the apparatus next includes a deposit of particulate filtering material atop the felting screen of each unit; a section line from said inlet opening to a supply of oil to be filtered; and a motor driven fluid pump with its inlet communicating with said outlet opening and its outlet communicating with an oil delivery line.

10 Claims, 8 Drawing Figures

FILTERING APPARATUS

This invention has to do with a filtering apparatus and is particularly concerned with an apparatus for filtering and purifying cooking shortening or oil.

BACKGROUND OF THE INVENTION

In the art of cooking food, certain foods are deep-fried, that is, they are immersed in hot shortening or oil for periods of time sufficient to suitably cook them.

In restaurants, fast food service outlets, and the like, deep frying of foods is carried out in applicances called "deep fryers". Deep fryers consist of large upwardly opening vessels in which substantial volumes of shortening or oil are deposited. The vessels have suitable gas or electric heating means and related temperature control means to heat and maintain the shortening or oil in the vessels at desired cooking temperatures.

The ordinary commercial deep fryer includes food retaining cooking baskets to effect controlled immersion of food in the heated oil; rack or hangers for the baskets; drip trays; and various other means to facilitate the effective and efficient cooking and handling of food.

Finally, the ordinary commercial deep fryer is provided with a valve controlled drain fitting at the bottom of its receptacle to facilitate draining of the shortening or oil therefrom, as desired and as circumstances require.

Commercial deep fryers of the general character referred to above are provided in several different sizes. The most popular size of deep fryers are designed to hold and operate efficiently with about fifty pounds of shortening or about 4½ gallons of oil. The cost of such quantities of shortening or oil presently ranges from about $25 to $50. Further, it is anticipated that the cost of such shortening or oil will increase dramatically in the foreseeable future and is likely to be double the noted cost within the next several years.

In most commercial establishments where deep fryers are used, a multiplicity of deep fryers are provided. In small establishments, it is not infrequent that two or three deep fryers are provided. In large establishments, it is not infrequent that eight or more deep fryers are provided.

In the case of small establishments with three deep fryers, the cost of shortening or oil in use at any given time is frequently about $150, while in the case of establishments with eight deep fryers, the cost of shortening or oil is frequently about $400.

In practice, the shortening or oil used in deep fryers, if not properly cared for, is short-lived and may be usable for from two to four days before the quality of the food cooked therein is adversely affected.

As a result of the foregoing, for obvious economic reasons, and to maintain high quality of the cooked foods, it is established and standard practice to subject the shortening or oil in deep fryers to daily filtering procedures in efforts to extend the useful life of the shortening or oil and to maintain the quality of the goods cooked therein at high standards.

During use of cooking shortening or oil in deep fryers, degradation of the shortening or oil commences as soon as it is heated and the first food to be cooked is immersed therein. Degradation of the shortening or oil continues at an accelerated rate as time elapses and the quantity of food cooked therein increases.

The principal causes of degration of the shortening or oil in deep fryers are oxidation caused by heat and the introduction of water (from the food cooked therein) and the introduction or addition of solid residues from the food cooked therein. The solid residues consist of bits and pieces of foodstuff and fatty acids and the like driven from the food during cooking thereof. The solid residues in the shortening or oil become scorched and result in tainting the shortening or oil and the food which is subsequently cooked therein with undesirable tastes and odors. The scorched residues also result in undesired discoloration of the oil and of the foods which are cooked therein. The fatty acids in the residues in the shortening or oil, in addition to scorching and the adverse effects thereof, react in the shortening or oil to cause and greatly accelerate oxidation and/or general breaking down and degradation thereof.

It has been found that by daily filtering of the shortening or oil used in deep fryers, to remove the collectible solid bits and pieces of food and the fatty acids carried thereby, the useful life of the shortening or oil can be extended from two to three days to from three to eight days. That is, by filtering out readily collectible solids, the life of the shortening or oil can be doubled and the cost thereof, to the operator, can be cut in half.

To the above end, and as noted above, it is a common and necessary practice in properly managed and operated facilities to filter the shortening or oil in deep fryers every day.

It has also been determined and it is well established that if the shortening or oil used in deep fryers can be filtered so as to remove micron and submicron size solids and can be treated to neutralize the fatty acids held in suspension therein, the life of the shortening or oil can be effectively doubled again, that is, its effective and useful life can be extended from six to fifteen days. When the shortening or oil is treated in the foregoing manner, it is said to have been "purified".

As a result of the foregoing, in the commercial food industry, there has developed two common practices for the care and handling of deep fryer shortening or oil.

One practice or procedure is where the operators of deep fryers contract with rendering companies or the like to be continually supplied with fresh shortening or oil to meet their daily needs. In furtherance of such practices or procedures, the rendering companies, on a regular basis, deliver fresh supplies of oil to the operators and pick up the spent or used shortening or oil. The rendering companies filter and purify the used oil which they collect for redistribution and use as fresh material (to the operators they serve).

The other common practice is where the operators of the deep fryers obtain and equip themselves with filtering means or apparatus capable of filtering their shortening or oil to an extent that the useful life thereof is doubled.

This second noted practice is finding ever increasing favor in the commercial food industry since the economic savings attained thereby are comparable with the savings attainable through the services afforded by rendering companies and the like and the operators are more self-sufficient or non-dependent upon outside services.

The ordinary shortening or oil filtering apparatus provided by the prior art, for use by operators of deep fryers, consist of receiver tanks into which the shortening or oil from deep fryers is delivered, under pressure, by means of electric pumps. The tanks are provided with perforated partitions or the like to support paper filter elements or sheets through which the shortening or oil is urged or advanced by the pumps and on which solid particulate matter, of sufficient size to be stopped by the filter paper, collect. The effective filtering surface area of the above noted filtering apparatus provided by the prior art is quite limited and is necessarily such that the screen size of the filter paper used must be sufficiently large so as to permit the passage of micron and sub-micron particles and to thereby prevent premature impacting and plugging up of the filter papers.

It has been found that when the filter papers in the prior art filtering apparatus become plugged and impacted with impurities and the apparatus continue to operate, the paper filters rupture and the entire filtering operations are rendered ineffective.

In the process of purifying shortening and oil, as practiced by commercial rendering companies and the like, the shortening or oil is generally passed through filter beds of fine powdered materials composed of diatomaceous silicia and calcium and/or magnesium silicates. The equipment which is required to effect passing the shortening or oil through such filter beds is so complicated, large and costly that the ordinary operator of deep fryers cannot afford such equipment and his facilities could not accommodate or house such equipment.

In certain of the filtering apparatus provided by the prior art and which use paper filter elements, attempts have been made to add fine powdered filtering material such as referred to above to the shortening or oil with the plan that that material will collect on the paper and establish an effective filter bed. While the foregoing appears sound in principle, it has proven to be unsound and totally impractical since the powdered filtering materials rapidly collects on, compacts and plugs up the limited surface area afforded by the paper filters and stops the filtering operation and/or results in the paper filter elements rupturing and rendering the entire filtering and/or purifying operation totally ineffective.

It has been determined that when powdered filtering and purifying material of the character referring to above is used to filter and purify shortening or oil by establishing a bed of that material atop a screen or paper filter, the bed of material must be maintained rather thin and therefore extended over a substantial or great effective surface area to prevent the bed of material from becoming so dense and compacted as to plug up and prevent a flow of fluid material therethrough. Further, it has been determined that to dependably establish and maintain continuous flow of fluid through such a bed of material, atop a filtering screen, and to prevent the fluid material from causing cavitation in and establishing courses of free flow of fluid through the bed of material, the fluid should be drawn or pulled through the bed of material by a vacuum or minus pressures downstream of the beds and should not be pushed or forced therethrough by positive upstream pressures.

In addition to the above, when shortening or oil is worked upon by vacuum or minus pressures in the course of filtering and purifying it, free oxygen and gases entrained in the shortening or oil is induced and caused to be liberated therefrom, thereby greatly enhancing the effectiveness of the purification process. In the case of working upon the materials with positive or super atmospheric pressures, the reverse is true, that is, entrained free oxygen and gases in the shortening or oil are caused to remain entrained therein to react therewith and accelerate degradation thereof.

OBJECTS AND FEATURES OF THE INVENTION

It is an object of my invention to provide a novel, highly effective and dependable apparatus for filtering and purifying cooking shortening or oil.

A further object of my invention is to provide a small, compact apparatus for the purpose set forth above which is particularly suitable for use by the operators and/or users of commercial deep fryers in restaurants and like food handling and/or processing facilities.

Yet another object and feature of my invention is to provide an apparatus of the general character referred to above which includes a plurality of special filter units releasably engageable in stacked relationship with each other and into and through which fluid shortening or oil being worked upon is drawn by means of a fluid pump downstream of the related or stacked units.

Still another object and feature of my invention is to provide an apparatus of the general character referred to above wherein each of the filter units has a flat horizontal upwardly disposed felting screen of substantial effective surface area to stop and establish a bed of powdered or particulate filtering and purifying material which is added to the shortening or oil to be worked upon prior to its being advanced to said units.

It is an object and feature of my invention to provide an apparatus of the character referred to above wherein the surface area of the several filter units is cumulative whereby the effective filtering surface area of the apparatus is such that the thickness or depth of beds of powdered filtering and purifying material is limited, controlled and is maintained at an effective and efficient depth which is such that plugging and/or excessive flow restriction therethrough will not develop.

It is another object and feature of my invention to provide an apparatus of the general character referred to above wherein the filter units include lower imperforate plates and outer walls in spaced relationship below and engaged about the felting screens to establish fluid conducting chambers below and throughout the planes of the screens, and filter units which include fluid conducting hubs communicating with the chambers and establishing parts and/or portions of a fluid conducting passage communicating with the downstream side of a fluid pump provided to draw fluid shortening or oil into, through and from the several filter units.

Yet another object and feature of my invention is to provide fluid filtering units of the general character referred to above including means within said chambers to support and maintain the felting screens above and clear of the plates whereby free flow of fluid throughout the chambers is assured and wherein the side walls of the units carry or define weirs of limited vertical extent about the perimeters of and projecting upwardly from the planes of the screens to retain beds of particulate filtering and purifying material of limited predetermined depth atop the screens.

An object and feature of this invention is to provide an apparatus with filter units of the general character referred to above whrein said hubs have central vertical fluid passages, radial fluid ports communicating with the passages and the chambers of the units.

A further object of the invention is to provide filter units with hubs of the general character referred to above having lower female ends and upper male ends whereby the upper male ends of the units enter the lower female ends of adjacent stacked units to releasably couple the units together with their fluid passages communicating with each other.

It is an object and feature of my invention to provide an apparatus of the character referred to above wherein the filter units can be easily, conveniently and quickly cleaned of their related beds of used or spent filter and purifying material by simply manually inverting and tapping each unit above a waste receptacle or the like and an apparatus which is such that the cost, handling and disposal of separable filter papers and the like is avoided.

Another object and feature of my invention is to provide an apparatus of the general character referred to above which includes a receptacle or vessel to receive shortening or oil to be filtered and purified and in which a measured volume of particulate filtering and purifying material can be added and mixed with said shortening or oil; a pressure tank in which the stacked filter units are removably arranged; a transfer pipe extending from the bottom of the tank to the bottom of the receptacle; an inlet pipe extending from the lowermost filter unit in the tank to the inlet side of a motor driven pump; and a delivery line extending from the outlet side of the pump to selectively deliver fluid flowing from said pump back into the receptacle for recirculation through the apparatus or to deliver filtered and purified shortening or oil issuing from the pump into a holding tank or deep fryer adjacent to the apparatus.

The foregoing and other objects and features of my invention will be fully understood from the following detailed description of a typical preferred form and application of my invention, throughout which description reference is made to the accompanying drawings.

DETAILED DESCRIPTION OF THE INVENTION

Figures 1, 2:
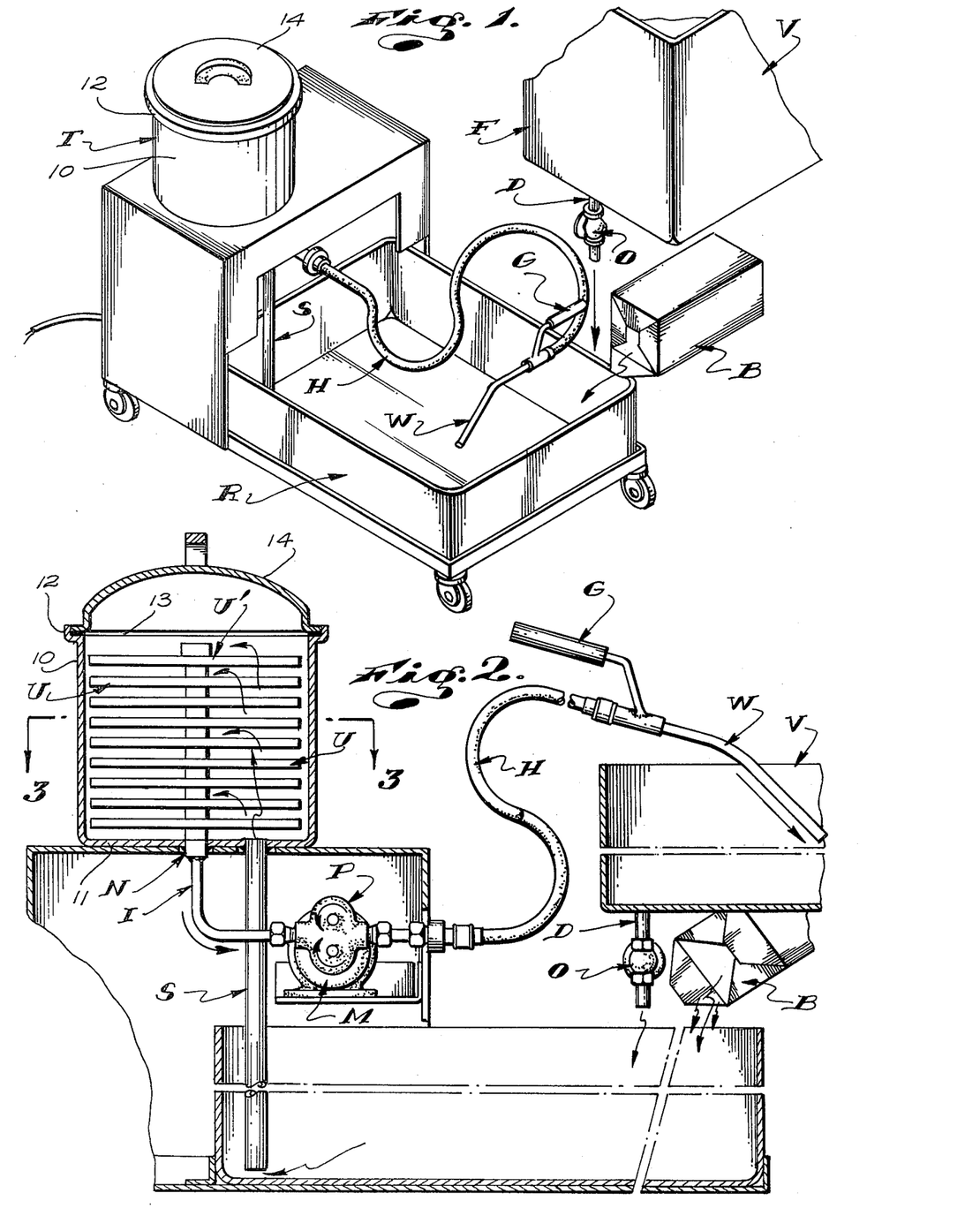
FIG. 1 is an isometric view of the apparatus that I provide.
FIG. 2 is a diagrammatic sectional view of the apparatus shown in FIG. 1 of the drawings.

Referring to FIG. 1 of the drawings, the filtering and purifying apparatus A that I provide includes an upwardly opening basin or tub-like receptacle R to receive a volume of hot fluid shortening or oil to be filtered and purified. The hot filtered shortening or oil is generally pumped, drained or otherwise transferred from the cooking vessel V of an adjacent deep frying machine F. The vessel V is shown provided with a drain pipe D having a manually operable on and off valve related to it to effect draining the shortening or oil from within the vessel V into the receptacle R.

It is to be particularly noted that the deep frying machine F can vary widely in form and construction without in any way affecting or departing from the present invention and that portions of the fryer F illustrated and described above is for illustrative purposes only.

The apparatus A next includes a pressure tank T spaced above the receptacle R at or adjacent one end portion thereof. The tank T is an elongate vertical structure having a cylindrical vertical side wall 10, a bottom wall 11 and an open top defined by a radially outwardly and upwardly turned rim 12 in which an annular seal 13 is seated. The top of the tank T is closed and is normally sealed by a manually engageable cover 14 with a sealing flange 15 about its perimeter establishing seated sealing engagement with the seal 13.

The tank T carries or is connected with the upper outlet end portion of an elongate suction pipe S. The other, lower or inlet end of the pipe S extends to and opens in the receptacle R, adjacent the bottom thereof. In the case illustrated, the upper outlet end of the pipe S is engaged through an opening in the bottom wall 11 of the tank T and is fixed therein by welding.

It will be apparent that the suction pipe S is a simple elongate fluid conducting member or part and may preferably comprise a flexible suction hose and suitable related hardware to effect its connection with the tank T.

The tank T next includes a central cylindrical vertically extending fluid conducting nipple N engaged through a central opening in the bottom wall 11 of the tank T to project freely upwardly therefrom into the tank and freely downwardly from the bottom thereof.

The lower end of the nipple N is connected with the inlet side of a fluid pump P by a fluid conductor I (preferably in the form of a metal pipe or tube).

The pump P is a positive displacement pump, such as a gear pump, suitable for operation at elevated temperatures and is driven by a suitable prime mover M, such as an electric motor.

Figures 3, 4, 5, 6:
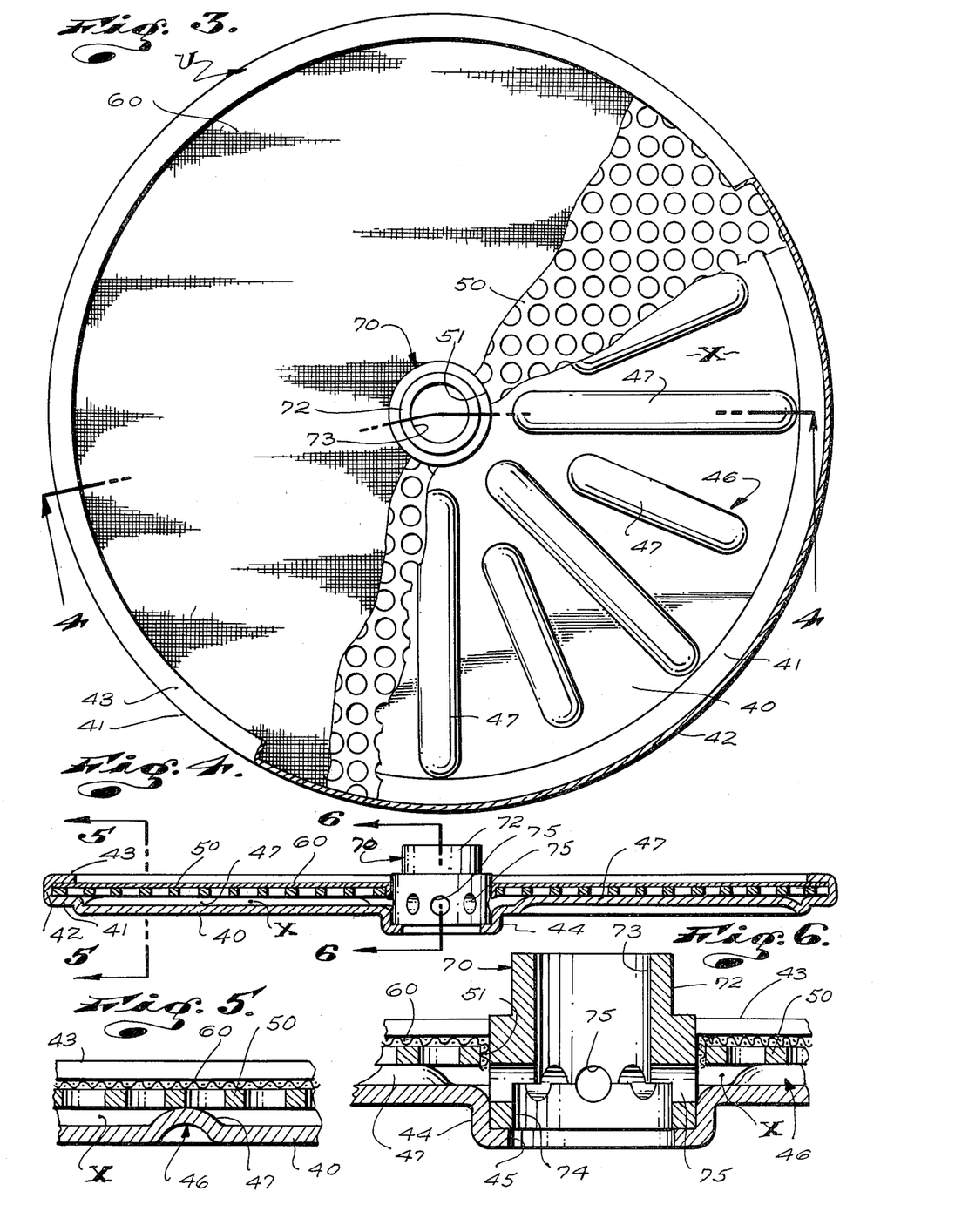
FIG. 3 is an enlarged view of a filter unit provided by the present invention, taken substantially as indicated by line 3—3 on FIG. 2 of the drawings and having portions broken away to better illustrate details of the construction.
FIG. 4 is a sectional view taken substantially as indicated by line 4—4 on FIG. 3.
FIG. 5 is an enlarged detailed sectional view of a portion of the construction and taken as indicated by line 5—5 on FIG. 4.
FIG. 6 is an enlarged detailed sectional view taken substantially as indicated by line 6—6 on FIG. 4.

The outlet side of the pump P has suitable couplings and/or hardware related to it to connect with the inlet end of an elongate flexible delivery hose H. The delivery hose H can, as shown in FIGS. 2 and 3 of the drawings, be provided with an elongate wand-like dispensing nozzle W with a heat insulated hand-grip G. The wand-like nozzle W with its hand-grip G is provided to facilitate manipulating the hose and to effect safe and convenient dispensing of hot liquid shortening or oil from the apparatus.

Finally, the apparatus A includes a plurality of like filter units U arranged within the tank T in stacked coupled relationship with each other and with the upper end of the nipple N.

Figure 8:
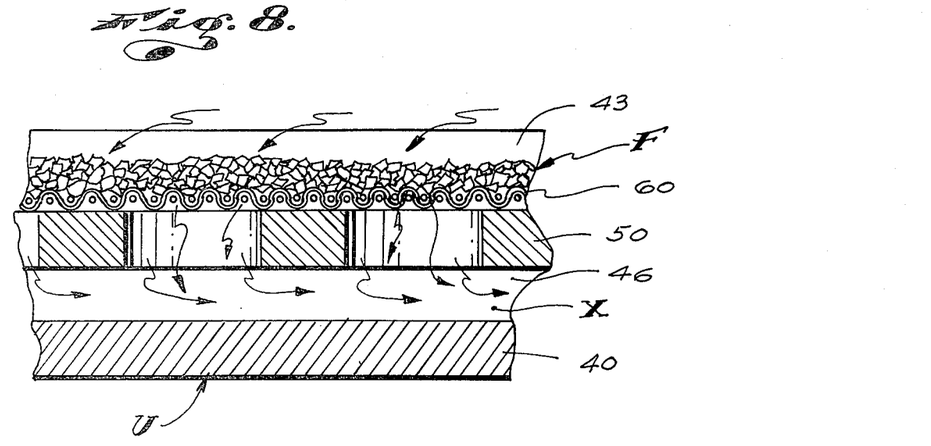
FIG. 8 is an enlarged detailed sectional view of a portion of the construction.

In addition to the foregoing and in normal use of the apparatus and carrying out of my invention, a supply of powder or particulate filtering and/or purifying material F is provided. The filtering material F can, as shown in the drawings, be contained in a convenient and easy to manipulate box-like container C. The container C is shown in FIGS. 1 and 2 of the drawings. The filter material F is shown related to and establishing a filter bed on a portion of a unit U in FIG. 8 of the drawings.

In practice, and as shown in the drawings, the receptacle R is removably carried by a flat horizontal rectangular frame 20 supported at its four corners by floor or deck engaging caster wheels 21. The tank T is carried atop an upwardly projecting housing 22 fixed to and projecting upwardly from one end portion of the frame 20 and beneath which an end portion of the receptacle R extends, to accommodate the lower end portion of the suction pipe S.

The motor M and pump P are suitably mounted within the housing 22 and the hose H extends from within the housing for convenient manual engagement and manipulation.

The principal features afforded by the caster wheel supported frame 20 and the housing 22 are: free mobility of the apparatus A and easy and convenient access to and removal of the receptacle R for purposes of cleaning that receptacle.

In addition to the foregoing, the apparatus A includes a power supply line and a manually operable on and off switch (not shown) for the motor M. A suitable hanger bracket for the wand-like nozzle W can be provided on the housing or frame and temperature and/or pressure gauges for monitoring operation of the apparatus can be provided, as desired or as circumstances require. All such added means and/or devices, if provided, do not alter or affect the broader aspects and/or spirit of the present invention.

The filter units U shown in FIGS. 2 through 8 of the drawings are like, special and novel units upon which the effective and efficient operation of the apparatus A is dependent.

While the units U can be of any desired plan configuration, for the purpose of this disclosure, I have shown them as flat, round, disc-like units.

Each unit U includes a horizontal bottom wall 40 with flat top and bottom surfaces; a flat horizontal upwardly disposed annular seat 41 about the perimeter of the bottom wall, on a plane spaced above the top surface of the said bottom wall; an annular vertical side wall 42 projecting upwardly from about the outer periphery of the seat 41; and a flat horizontal annular weir 43 projecting radially inwardly from the upper edge of the side wall 42 in parallel vertical spaced relationship above the seat 41.

In addition to the foregoing, the bottom wall 30 of the unit U includes a central downwardly and thence radially inwardly projecting annular seat 44 defining a central upwardly opening socket with a central vertical opening 45.

The bottom wall 40 and its related seat 41, side wall 42, weir 43, and socket and opening defining seat 44 are preferably integrally formed of a single piece of sheet metal stock, such as aluminum, by suitable stamping and forming operations.

Finally, and in addition to the foregoing, in the preferred form and carrying out of my invention and as shown in the drawings, the bottom wall 40 is formed to establish spacer means 46 to engage and maintain a plate-like support 50 in parallel spaced relationship above the top surface of the bottom wall 40 and to cooperate therewith to define a flow chamber X within the unit. The spacer means 46 includes a plurality of circumferentially spaced elongate, radially extending and upwardly projecting concavo convex ribs 47 formed in the bottom wall 40 by a suitable forming operation, as clearly shown in FIGS. 3 through 7 of the drawings.

In practice, the spacer means 46 could, if desired, be established by other than the ribs 47 formed integrally in the bottom wall 40. For example, separate spacer strips might be substituted therefore, without departing from the broader aspects of my invention.

The plate-like support 50 is a rigid disc-shaped load supporting member or plate formed of heavy gauge perforated sheet metal, such as aluminum. The perforated support plate 50 is such that it allows for the free flow of fluids or liquid mediums through it and is preferably about 50% opened.

The outer peripheral edge of the support plate 50 enters and occurs within the space between the seat 41 and the weir 43 and occurs radially inward of the side wall 42.

The center of the support plate 50 has a central opening 51 concentric with and spaced above the socket and opening 45 in the bottom wall 40.

Each unit U next includes a felting screen 60 which is sufficiently fine to cause particulate matter ranging in size from about one-half micron to two microns to stop and establish bridging engagement with each other and across the interstices of the screen when said particles are advanced into contact with the screen.

The screen 60 is a flat horizontally disposed disc-shaped piece of woven metal fabric corresponding generally in plan configuration with the support 50 and is arranged atop the support 50 in bearing supported engagement therewith. The screen 60 is sufficiently strong and dimensionally stable so that those portions of the screen which extend across the perforations or apertures in the support plate 50 will not, in the course of operation of the apparatus, be deformed or otherwise urged or displaced downwardly into or through the perforations in the support plate.

Accordingly, the support plate 50 functions to support the screen 60 in spaced relationship above the bottom wall 40 and prevents the screen from being moved or urged downwardly and into the chamber X of the unit in a manner which might close the chamber or interfere with the free and uniform distribution of pressure in and the free flow of fluids through the chamber.

The outer peripheral portion of the screen 60, like the outer peripheral portion of the support plate 50, occurs between the seat 41 and weir 43 and the support plate and screen are securely held in tight clamped and fixed relationship with and between said seat and weir.

Finally, each unit U includes an elongate, vertical central fluid conducting hub 70 having a cylindrical lower portion 71 press-fitted into stop seated engagement in the socket and/or seat 41 at the center of the bottom wall 40 and which extends through the central opening 51 in the support plate 50 and through a corresponding central opening in the screen 60.

Figure 7:
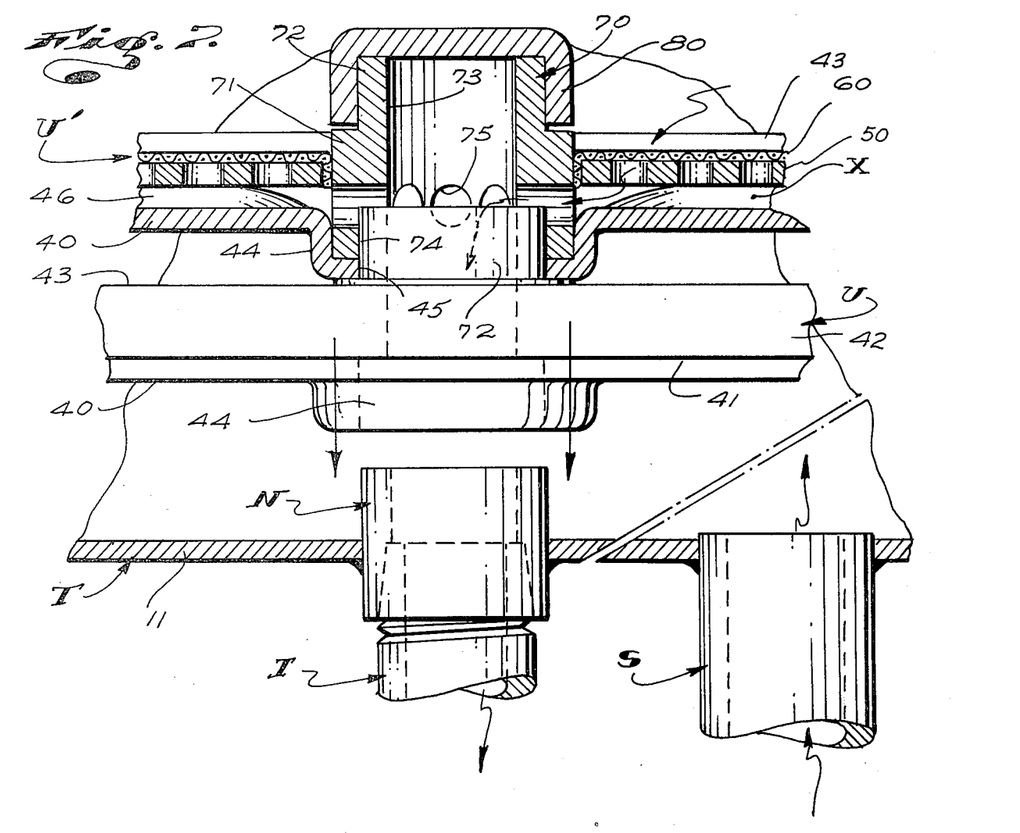
FIG. 7 is an enlarged detailed sectional view of portions of the apparatus in partially assembled relationship and with portions broken away to better illustrate details of the construction.

In practice, and as best shown in FIGS. 6 and 7 of the drawings, the central portion of the screen 60, about the central opening therein, is turned downwardly into the central opening 51 in the support plate 50 and is held in tight interfering fit between the support plate 50 and the hub 70 so that the central portion of the screen 60 is held down and in position atop the support plate 50.

The hub 70 next has a central, cylindrical upper male portion 72 of reduced diameter projecting freely upwardly from the lower portion 71 thereof and has a central vertical flow passage 73.

The lower end portion 71 of the hub 70 has a central downwardly opening socket 74 corresponding in diametric and axial extent with the upper male portion 72 to slidably receive the upper end portion of the nipple N at the bottom of the tank T or the male portion 72 of the hub 70 on a next lower or adjacent filter unit U.

Finally, the hub 70 of each unit U includes a plurality of circumferentially spaced radially extending flow ports 75 with outer open ends communicating with the chamber X and inner open ends communicating with (in whole or in part) with the flow passage 73 above the socket 74, as clearly shown in FIGS. 4, 6 and 7 of the drawings.

In practice, there exists a top unit U' in the related and stacked units. The unit U' is distinguishable from all of the other units by the inclusion or addition of a closure or cap 80 engaged with the male portion 72 of the hub 70 and which closes the upper end of the passage 73 in that hub. The cap 80 can be fixed on or can be removably engaged with its related hub, as desired or as circumstances require. But for the cap 80, the unit U' is identical with all other units U.

In practice, the number of units U employed during use and operation of my apparatus can be varied so as to provide the apparatus with a desired and most effective filtering area for the volume and condition of the shortening or oil to be worked upon.

If a small volume of rather clean oil, that is, shortening or oil which has been used to fry clean cooking food, such as french-fried potatoes, two units U (as indicated in FIG. 7 of the drawings) may be all that is required. On the other hand, if a rather large volume of shortening or oil in which batter covered fatty foods such as chicken has been fried, nine units (for example) such as shown in FIG. 1 of the drawings, may be required.

In practice, a unit U 9½" in diameter establishes about 75 square inches of effective filtering surface area. Accordingly, the effective filtering area in the apparatus can be adjusted to any desired multiple of 75 square inches by adding or subtracting to the number of units U which are arranged in stacked, coupled relationship in the tank T.

It has been determined that my apparatus A designed to provide a maximum of about 700 square inches of effective filtering area is practical and convenient to use and has a capacity which is satisfactory for use in the great majority of fast food outlets and the like.

In practice, units of the size indicated above, are about 1½" in vertical extent and when arranged in vertical stacked and coupled relationship with each other are such that their mean horizontal planes, or the planes of their screens 60, are spaced vertically, one from the other, about 1½".

Accordingly, the tank T of the apparatus A in which the units U are arranged need only be about 10" in inside diametric extent and, to accommodate units in vertical stacked relationship and to establish 700 or 720 square inches of effective filtering area need only be about 15" in height or vertical extent. Such a tank is rather small in comparison to the work that can be carried out therein; is inexpensive to make and most important, presents a structure wherein the surface area to be cleaned is easily accessible and small.

It is to be noted that when the male portion 72 of the hubs of related units U and U' are engaged in the sockets 74 of their adjacent related hubs, the hubs of the units are effectively and suitably sealingly coupled one with the other, in axial alignment and with the several flow passages 73 thereof cooperating to define a single central longitudinally extending flow passage through the assembly. The upper end of the flow passage established by the several units is closed by the cap 80 on the uppermost unit U', the lower end of that flow passage communicates with the nipple N at the bottom of the tank T and the flow ports 75 establish communication between the flow passage through the assembly of hubs and the chambers X of the several filter units. With the above relationship of parts, when the pump P is operating, it will be apparent that the pump P establishes a minus pressure throughout the apparatus, downstream of the pump and that fluid shortening or oil in the receptacle R is drawn in and up through the suction pipe S into the tank T, to flood the tank T. The fluid shortening or oil flooding the tank T is drawn through the screens of the several units into the chambers C thereof, through the ports 75 into the flow passage defined by the several units and thence down through the nipple N and line I into the inlet side of the pump P. The liquid shortening or oil discharged from the pump is conducted through the hose H to the wand-like nozzle N from which it is suitably discharged. The liquid shortening or oil discharged from the wand-like nozzle can be directed back into the receptacle R for recirculation through the apparatus or can be discharged into the tank or vessel V of the deep fry machine F from which it was originally drawn.

It is important to note that the pump P operates to draw a vacuum in the tank T and to draw the shortening or oil worked upon into and through the filter units U. The pump P is not utilized to drive or push the fluids being worked upon into and through the filter units.

As a result of the above, it will be apparent that the pump P is only made to work upon and move fluids which have been filtered and cleaned and to work upon fluids from which air and other gases or fluid impurities, which might adversely affect operation of the pump, have been removed.

The powder or particulate filtering additive used in combination with the filtering units U and U' of my apparatus can vary widely. In practice, the additive can be composed entirely if diatomaceous silicia or is composed of a mixture of ingredients composed primarily of diatomaceous silicia. Pure diatomaceous silicia is employed where filteration of the shortening or oil being worked upon is the only end sought to be attained. In practice, a mixture composed of diatomaceous silicia, as its principal ingredient, and lesser quantities of calcium silicate and magnesium silicate has been found to be most effective to filter and to purify cooking shortening and oil, used in deep fry machines.

Diatomaceous silicia is a well known hygroscopic and absorbant material which is particularly effective and suitable for collecting and removing free water and certain other fluid and solid materials from cooking shortening and oil. It is composed of particles of substantial size and of irregular shape which, when stopped by suitable supporting structures, such as the screens 60 of the units U, establish bridging engagement with each other and establish a bed of material with a multiplicity of interconnected interstices which is a highly effective and efficient filtering medium.

The particles of diatomaceous silicia are not very strong and are such that if subjected to more than moderate externally applied compressive forces they will tend to crush or collapse and create a bed which has few and small interconnected interstices which are subject to being occupied and filled with filtrates at such an accelerated or fast rate that the bed becomes substantially imperforate or impervious and is ineffective as a filtering medium. As a result of the above, it has been found that in the course of filtering cooking shortening and oil in small portable filtering apparatus of the general class here concerned with, the depth of the bed or beds of diatomaceous silicia must be maintained rather shallow or of minimum depth and must be extended over a wide or great effective surface area to dependably establish and maintain an effective, non-plugging filter bed.

In practice, the depth of the bed of diatomaceous silicia on the screens 60 of the units U is preferably about equal to the vertical extent of the weirs 43 about the perimeters of and projecting upwardly from the top planes or surfaces of the screens 60.

More important, for effective operation of the apparatus A, the beds of diatomaceous silicia must be deposited substantially uniformly throughout the entire upwardly disposed surfaces of the screens 60 so as not to leave portions of the screen exposed for the free flow of shortening or oil therethrough.

In the present invention, the weirs 43 about the perimeter of the screens 60 hold or prevent the powdered filtering material or diatomaceous silicia, collected on the screens, from flowing or migrating radially outwardly and from atop the outer peripheral portions of the screen and to thereby render the units inoperative.

The weirs 43 also establish the maximum desired depth of the beds of filtering material collected by and supported atop the screens 60.

In practice, maintaining the filtering units and their screens absolutely horizontal and such that the collecting of a uniform bed of filtering material atop the screens cannot be assured. The units U are not at all times perfectly horizontal but are frequently tilted slightly. When the units are tilted, the weirs 43 are effective to stop the filtering material at the lower-most edges of the screens and to establish beds of filtering material at, along or across the lower portions of the screens and upon which beds of filtering material, extending throughout the entire surfaces of the screens can and will be built.

In practice, the powder or particulate filtering material is added to the fluid shortening or oil deposited in the receptacle R of the apparatus, preparatory to being worked upon and is mixed in and with the shortening or oil so that it is substantially uniformly distributed in and throughout the oil, in free suspension therein.

The additive absorbs substantial moisture and impurities from the shortening and oil when it is in the receptacle R and is collected with its collected impurities on the screens 60 of the units U and U', as the shortening or oil is advanced through the apparatus. The other ingredients in the filtering additive, such as calcium silicate and/or magnesium silicate are in particulate form and such that they are captured and held in and by the bed of diatomaceous silicia on the screens 60 of the filter units U. The shortening or oil flowing through the filter beds, atop the screens 60 is caused to flow by and into intimate contact with the other additives whereby they effectively act on or react with the impurities in the shortening or oil to neutralize or otherwise alter the impurities in some predetermined manner.

It is to be noted that the precise nature and/or chemical characteristics of the ingredients in the filtering additive is not fully known to me or is such that I cannot, with certainty, state exactly what each material does. The present invention is primarily concerned with that structure and/or those mechanical means in and by which those filtering additives noted above and other suitable additives can be most effectively, efficiently and dependably utilized.

In furtherance of the above, while I have noted diatomaceous silicia as the primary ingredient of the filtering additive and calcium and magnesium silicate as secondary ingredients in the additive, tests have demonstrated that my new apparatus is highly effective and dependable when additives composed of other and different materials are used.

An important feature of my invention resides in the fact that the pump P is downstream of the filter units U and U' and is such that it does not mechanically work upon and break down the filtering and/or purifying additives in such a manner that they cannot be effectively stopped by the screens 60 of the units U to establish an effective and desirable filtering bed.

Another important feature of my invention resides in the fact that after the apparatus has been used and it is desired to clean the apparatus, the cover 14 of the tank T can be manually removed to afford easy manual access to the filter units U and U'.

The units U and U' can be manually engaged, one at a time, and removed from the apparatus. When removed from the apparatus, the units can be manually turned or inverted, above the waste receptacle or the like, and can be tapped or wrapped in any suitable manner to free, dislodge and dispose of the used bed of filter material previously collected thereon. Thereafter, the units U need only be flushed with warm water to effect their cleaning and preparation for subsequent use.

In normal daily use, the remainder of the apparatus A can be adequately cleansed, after each use, by simply depositing a volume of hot water, containing a small amount of detergent, into the receptacle R and then operating the apparatus, without the filter units therein, to flush and clean the apparatus. Subsequent to flushing and cleaning the apparatus with water and detergent, a volume of warm or hot clear water can be circulated through the apparatus in like manner to rinse it. Periodically, a more extensive towel and cleanser method of cleaning and flushing of the apparatus is required to prevent an undesired accumulation of oils and waste materials in those corners and areas of the apparatus which are least effectively clean by the aforementioned flushing operation.

In use and operation of the apparatus A where light, thin, and rather fresh or clean cooking oil is worked upon, it is possible to effect filtering of the oil when it is at or near ambient temperature. In the case of cooking shortening and particularly shortening which is substantially spent or heavily ladened with fats which tend to congeal at ambient temperature, the shortening must be hot when processed in and by my apparatus. In either event, the thinner and more fluid the shortening or oil is, the faster and better my apparatus will work. Accordingly, and to assure the most effective and efficient operation of my apparatus, it is preferred and recommended that the shortening or oil be heated to, for example, about 300° F. when worked upon in and by my apparatus. Since the shortening or oil being worked upon is shortening or oil in deep fryers which is heated prior to being processed in my apparatus or will be heated and put to use following its being treated in and by my apparatus, heating of the shortening or oil for processing in my apparatus presents no material loss of time or energy and presents no material inconvenience.

Having described only one typical preferred form and application of my invention, I do not wish to be limited to the specific details herein set forth but wish to reserve to myself any modifications and/or variations that may appear to those skilled in the art and which fall within the scope of the following claims:

Having described my invention, I claim:

1. An oil filtering and purifying apparatus comprising a receptacle open to atmosphere, a supply of oil ladened with particulate and gaseous impurities in the receptacle, a vessel opened to atmosphere to receive oil worked upon, a closed pressure tank with an inlet opening and an outlet opening; a fluid conductor communicating with and between the inlet opening and the supply of oil; a motor driven pump with inlet and outlet sides; a fluid duct between and communicating with said outlet opening and the inlet side of the pump; a fluid delivery line between and communicating with the outlet side of the pump and the vessel and a filter unit assembly in the tank and connected with the outlet opening, whereby oil in the tank flows through the assembly and particulate impurities are separated therefrom as it flows to said outlet opening, said pump operates to establish a negative pressure in the tank, whereby oil from the supply of oil flows into the tank and is acted upon by said minus pressure, whereby gaseous impurities separate therefrom and operates to draw oil in the tank through the filter unit assembly from the tank and thence into said vessel 2. The apparatus set forth in claim 1 wherein each filter unit includes a particulate matter retaining weir projecting upwardly from and about the perimeter of the screen.

3. The apparatus set forth in claim 2 wherein said coupling means includes downwardly opening sockets in the lower ends of said hubs, cylindrical male portions at the upper ends of the hubs and slidably engaged and seated in the sockets of the hubs of adjacent filter units and a tubular cylindrical nipple communicating with said outlet opening and engaged in the socket of the lowermost filter unit.

4. The apparatus set forth in claim 1 wherein said coupling means includes downwardly opening sockets in the lower ends of said hubs, cylindrical male portions at the upper ends of the hubs and slidably engaged and seated in the sockets of the hubs and slidably engaged and seated in the sockets of the hubs of adjacent filter units and a tubular cylindrical nipple communicating with said outlet opening and engaged in the socket of the lowermost filter unit.

5. The apparatus set forth in claim 1 wherein the spacer means includes a plurality of vertically upwardly projecting projections formed in the lower plate and engaging the bottom of the support plate.

6. The apparatus set forth in claim 1 wherein the spacer means includes an annular seat on a plane spaced above the top plane of and formed integrally with the lower plate and plurality of projections formed in the lower plate radially inward of the seat to project upwardly therefrom and engaging the support plate.

7. The apparatus set forth in claim 6 wherein the side wall is formed integrally with the seat, said weir is formed integrally with said side wall and is spaced above the seat with the outer edge portions of the support plate and screen in clamped engagement therebetween.

8. The apparatus set forth in claim 6 wherein said coupling means includes downwardly opening sockets in the lower ends of said hubs, cylindrical male portions at the upper ends of the hubs and slidably engaged and seated in the sockets of the hubs of adjacent filter units and a tubular cylindrical nipple communicating with said outlet opening and engaged in the socket of the lowermost filter unit.

9. The apparatus set forth in claim 1 wherein the tank has an open top, a cover removably engaged with and closing the open top of the tank and sealing means between the tank and the cover whereby the tank can be opened for manual access to and removabl of the filter units from the tank.

10. The apparatus set forth in claim 1 wherein said filter assembly includes a plurality of like filter units in vertical stacked relationship in the tank, each filter unit includes an elongate vertical hub with a central vertical flow passage, coupling means releasably coupling the lower end of each hub with the upper end of each adjacent lower hub and the lower end of the lowermost hub with the tank with adjacent flow passages and said outlet opening communicating with each other, means closing the upper end of the flow passage in the uppermost filter unit, each filter unit further includes a lower plate carried by and projecting radially from the hub, spacer means projecting up from the plate, a perforated support plate supported by the spacer means above the lower plate, an outer wall about the plates and cooperating therewith to define a fluid conducting chamber, fluid ports in the hub communicating with the chamber and the flow passage, a felting screen in supported engagement atop the support plate to stop particles of foreign matter and a filtering bed of particulate material atop the screen.

* * * * *